US006442283B1

(12) United States Patent
Tewfik et al.

(10) Patent No.: US 6,442,283 B1
(45) Date of Patent: Aug. 27, 2002

(54) MULTIMEDIA DATA EMBEDDING

(75) Inventors: Ahmed Tewfik, Edina; Mitchell D. Swanson, Minneapolis; Bin Zhu, St. Paul, all of MN (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/228,224

(22) Filed: Jan. 11, 1999

(51) Int. Cl.$^7$ ................................................. G06K 9/00
(52) U.S. Cl. ...................... 382/100; 382/232; 380/210; 380/252
(58) Field of Search ................................ 382/100, 232; 380/210, 252, 287, 54; 413/176; 704/200.1, 273; 381/73.1; 348/460, 463

(56) References Cited

U.S. PATENT DOCUMENTS

| | | |
|---|---|---|
| 3,406,344 A | 10/1968 | Hopper |
| 3,845,391 A | 10/1974 | Crosby |
| 4,313,197 A | 1/1982 | Maxemchuk |
| 4,425,661 A | 1/1984 | Moses et al. |
| 4,939,515 A | 7/1990 | Adelson |
| 4,943,973 A | 7/1990 | Werner |
| 5,319,735 A * | 6/1994 | Preuss et al. .............. 395/2.14 |
| 5,404,377 A | 4/1995 | Moses |
| 5,450,490 A | 9/1995 | Jensen et al. |
| 5,613,004 A | 3/1997 | Cooperman et al. |
| 5,649,054 A | 7/1997 | Oomen et al. |
| 5,774,452 A | 6/1998 | Wolosewicz |
| 5,809,139 A * | 9/1998 | Girod et al. .................... 380/5 |
| 5,822,360 A | 10/1998 | Lee et al. |
| 5,822,432 A | 10/1998 | Moskowitz et al. |
| 5,848,155 A | 12/1998 | Cox |
| 5,889,868 A | 3/1999 | Moskowitz et al. |
| 5,905,800 A | 5/1999 | Moskowitz et al. |
| 5,915,027 A | 6/1999 | Cox et al. |
| 5,930,369 A * | 7/1999 | Cox et al. ...................... 380/54 |
| 5,933,798 A | 8/1999 | Linnartz |

(List continued on next page.)

FOREIGN PATENT DOCUMENTS

| | | |
|---|---|---|
| GB | 2196167 | 4/1988 |
| WO | WO98/53565 | 11/1998 |
| WO | WO00/00969 | 1/2000 |
| WO | WO00/22745 | 4/2000 |

OTHER PUBLICATIONS

Haitsma et al., Audio Watermarking for Monitoring and Copy Protection, ACM Multimedia Workshop, 2000, pp. 119–122.

Schreiber et al., "A Compatible High–Definition Television System Using the Noise–Margin Method of Hiding Enhancement Information," SMPTE Journal, Dec. 1989, pp. 873–878.

Swanson et al., "Data Hiding for Video–in–Video," 1997 IEEE, pp. 676–679.

Tewfik, Data Embedding Imagery and Its Applications, AFRL Presentation, Jul. 1998.

Tewfik, "Data Embedding in Imagery," ARFL Presentation, Feb. 1999.

(List continued on next page.)

Primary Examiner—Joseph Mancuso
Assistant Examiner—Anand Bhatnagar
(74) Attorney, Agent, or Firm—Joel R. Meyer; Digimarc Corporation

(57) ABSTRACT

Multimedia data embedding, such as video, image or audio data watermarking. In one embodiment, a computer-implemented method first receives a vector x of N data samples, where $X=[x(0)x(1) \ldots x(N-1)]$ and represents multimedia. Next, the method receives a vector p, where $P=[p(0)p(1) \ldots p(N-1)]$ and represents a pseudo-random sequence. Finally, the method generates a new vector x' in which the vector p is embedded in the vector x, such that $x'=[x'(0)x'(1) \ldots x'(N-1)]$ and $x'=x+aq$, where a comprises a perception-based scaling factor and the vector q comprises a perceptually weighted pseudo-random sequence based on the vector p.

13 Claims, 3 Drawing Sheets

U.S. PATENT DOCUMENTS

| | | | |
|---|---|---|---|
| 5,937,000 | A | 8/1999 | Lee et al. |
| 5,940,135 | A | 8/1999 | Petrovic et al. |
| 5,940,429 | A | 8/1999 | Lam et al. |
| 5,945,932 | A | 8/1999 | Smith et al. |
| 6,031,914 | A | 2/2000 | Tewfik et al. |
| 6,061,793 | A | 5/2000 | Tewfik et al. |
| 6,078,664 | A | 6/2000 | Moskowitz et al. |
| 6,122,403 | A | 9/2000 | Rhoads |
| 6,219,634 | B1 | 4/2001 | Levine |
| 6,226,387 | B1 | 5/2001 | Tewfik et al. |
| 6,233,347 | B1 * | 5/2001 | Chen et al. ............... 382/100 |
| 6,282,299 | B1 | 8/2001 | Tewfik et al. |
| 6,285,774 | B1 * | 9/2001 | Schumann et al. ......... 382/100 |
| 2001/0012377 | A1 * | 8/2001 | Rhoads ....................... 382/100 |

OTHER PUBLICATIONS

Zhu et al., "Image Coding by Folding," Proc. Intl. Conf. on Image Processing, vol. 2, pp. 665–668, Oct. 1997.

*Secure Hash Standard*, Federal Information Processing Standards Publication, U.S. Department of Commerce, Technology Administration, National Institute of Standards and Technology, (Apr. 1995).

Goldwasser, S., et al., "Lecture Notes on Cryptography", http://www–cse.ucsd.edu/users/mihir/papers/crypto–papers.html, (Jul. 1996).

Lin, S., et al., *Error Control Coding: Fundamentals and Applications*, Table of Contents, (1983).

Quatieri, T.F., et al., "Speech Transformations Based on a Sinusoidal Representation", *IEEE Transactions on Acoustics, Speech, and Signal Processing*, pp. 1449–1464, (Dec. 1986).

Rivest, R.L., "Cryptography", *In: Handbook of Theoretical Computer Sciences, vol. A, Ch. 13*, Van Leeuwen, J., (ed.), pp. 717–755, (1990).

Rivest, R.L., "The MD4 MEssage Digest Algorithm", *Advances in Cryptology—CRYPTO '90*, pp. 303–311, (1991).

Thompson, D.J., "Spectrum Estimation and Harmonic Analysis", *Proceeding's of the IEEE, 70* (9), pp. 1055–1096, (Sep. 1982).

* cited by examiner

MULTIMEDIA DATA EMBEDDING

FIELD OF THE INVENTION

This invention relates generally to multimedia data, and more particularly to multimedia data embedding.

BACKGROUND OF THE INVENTION

With the increasingly popularity of multimedia-capable computers, and the digitalization of multimedia in general, the importance of multimedia data embedding has become more important. In one type of multimedia data embedding, a key, also known as a watermark, is embedded into multimedia data, a process which is known as watermarking. This allows questions of ownership of a given piece of multimedia data—which may be widely distributed by virtue of the Internet, for example—to be resolved, by attempting to decode the key from the multimedia data. That is, by watermarking multimedia data, the data owner can determine whether a suspect piece of multimedia data is his or hers by determining whether the watermark is present in the suspect data.

For example, a record company, prior to making its music selections available on the Internet for widespread purchase and use, can first watermark the data representing a music selection. If a site on the Internet is providing bootleg copies of the music selections, but claims that the copies are not in fact owned by the record company, the company can prove that they are indeed owned by it by showing that the watermark is present in the bootleg copies. Therefore, watermarking has applicability to audio multimedia, as well as other types of multimedia, such as image and video multimedia.

SUMMARY OF THE INVENTION

In one embodiment, a computer-implemented method first By receives a vector x of N data samples, where x=[x(0)x(1) . . . x(N−1)] and represents multimedia. Next, the method receives a vector p, where p=[p(0)p(1) . . . p(N−1)] and represents a pseudo-random sequence. Finally, the method generates a new vector x' in which the vector p is embedded in the vector x, such that x=[x'(0)x'(1) . . . x'(N−1)] and x'=x+aq, where a comprises a perception-based scaling factor and the vector q comprises a perceptually weighted pseudo-random sequence based on the vector p.

In at least some embodiments, the resulting new vector x' represents a watermarked version of the multimedia data represented by the vector x. The watermarked data may then be distributed by the owner thereof, with the assurance of knowing that should an ownership issue arise, the key or watermark as represented by the vector p can be decoded from the watermarked data, to prove ownership. The multimedia can be audio, image or video; the invention is not so particularly limited.

DETAILED DESCRIPTION OF THE INVENTION

In the following detailed description of exemplary embodiments of the invention, reference is made to the accompanying drawings which form a part hereof, and in which is shown by way of illustration specific exemplary embodiments. in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
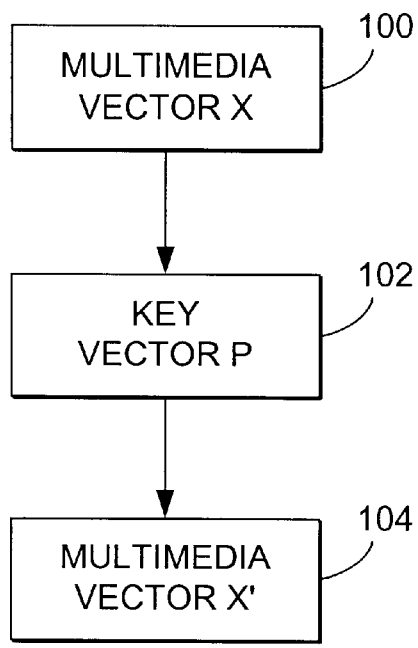
FIG. 1 shows a flowchart of a computer-implemented embedding method according to an embodiment of the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should-be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.
Methods Referring first to FIG. 1, a computer-implemented embedding method according to an embodiment of the invention is shown. That is, the method of FIG. 1 embeds a key p into multimedia data x, to generate watermarked data x'. The computer-implemented method is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer, for example, over the Internet.

In block 100, a vector x is received that represents multimedia data, such as audio, image, or video data; the invention is not so limited. In block 100, $$x=[x(0)x(1) \ldots x(N-1)]$$

and denotes a vector of N data samples.

In block 102, a vector p is received that represents a pseudo-random sequence. The vector p is the key or watermark that is to be embedded in the vector x. More specifically, $$p=[p(0)p(1) \ldots p(N-1)]$$

and represents a cryptographically secure pseudo-random sequence generated from a one-way function and a key, as known within the art.

In block 104, a vector x' is generated, in which the vector p is embedded into the vector x. The vector x' is the watermarked data, or the data into which the key has been embedded. More specifically, the new data vector $$x'=[x'(0)x'(1) \ldots x'(N-1)]$$

is generated by adding a second vector to the data vector x producing the new data vector $$x'=x+aq \tag{1}$$

where a is a perception-based scaling factor and vector q is a. perceptually weighted pseudo-random sequence. Both components a and q are perception-based to insure that x and x' are indistinguishable to the human audio or visual systems for audio and image/video data, respectively. The computation of q and a depend on the pseudo-random sequence p and a weighting mechanism as described below. Note that the new data vector in (1) may be represented by $$x' = x + \sum_{n=0}^{N-1} a_n q_n$$

where N orthogonal pseudo-random sequences $q_n$ are employed. Each term $a_n q_n$ is used to carry one bit of information.

Figure 2:
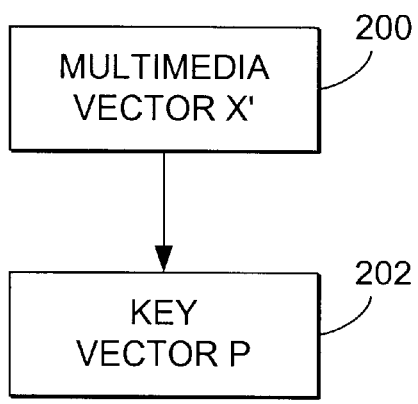
FIG. 2 shows a flowchart of a computer-implemented decoding method according to an embodiment of the invention.

Referring next to FIG. 2, a flowchart of a computer-implemented decoding method is shown. That is, the method of FIG. 2 generates a key vector p as embedded from a multimedia vector x', as such a multimedia vector x' has been generated in accordance with the method of FIG. 1. Like the method of FIG. 1, the computer-implemented method of FIG. 2 is desirably realized at least in part as one or more programs running on a computer—that is, as a program executed from a machine-readable medium such as a memory by a processor of a computer. The programs are desirably storable on a machine-readable medium such as a floppy disk or a CD-ROM, for distribution and installation and execution on another computer, for example, over the Internet.

In block 200, a multimedia vector x' is first received, from in which a key p has been embedded into a multimedia vector x. In block 202, the key p is decoded from the vector x'. To decode the embedded data, a scaled inner product between the new data vector x' and the pseudo-random sequence p is computed $$\frac{1}{T}\sum_{i=0}^{N-1} p(i)\frac{x'(i)}{w(i)} = \tag{2}$$

$$\frac{1}{T}\sum_{i=0}^{N-1} p(i)x(i) + \frac{aq(i)}{w(i)} = \frac{1}{T}\sum_{i=0}^{N-1} p(i)\frac{x(i)}{w(i)} + \frac{a}{T}\sum_{i=0}^{N-1} p(i)\frac{q(i)}{w(i)}$$

where w is a vector of weights as described below. The value of T dictates the quantization step of the algorithm and is dependent on the weighting mechanism employed. The first term on the right hand side of (2) is referred to as the residual. It represents the projection of the original data sequence x onto the pseudo-random direction p weighted by w. The second term on the right hand side of (2) is the projection of the shaped pseudo-random sequence q with the pseudo-random direction p weighted by w.

As described in (1), the second term carries the embedded information. The residual R $$R = \frac{1}{T}\sum_{i=0}^{N-1} p(i)\frac{x(i)}{w(i)} \tag{3}$$

is known. Using this knowledge, a variable d is defined where $$d=B-R$$

and $$B = \begin{cases} 0 & \text{if } b=1 \\ 1/2 & \text{if } b=0 \text{ and } R>0 \\ -1/2 & \text{if } b=0 \text{ and } R<0 \end{cases}$$

where b is the data bit to embed. The variable a in (1) is computed as $$a = \frac{dT}{\sum_{i=0}^{N-1} p(i)\frac{q(i)}{w(i)}} \tag{4}$$

Substituting (3) and (4) into (2), the embedded data can be recovered without error in an environment without distortion.

In at least some embodiments of the invention, factors to consider when embedding data in audio, the weighting function w, and the shaped pseudo-random sequence q are described below.

Audio Data Hiding Considerations

The audio data hiding algorithm works by making perceptually insignificant modifications to the audio samples. The audio signal is modified in blocks of size Nb, i.e., Nb consecutive samples of the audio are processed at the same time. In one implementation, the blocks are non-overlapping. However, overlapping blocks may be used.

The data embedding algorithm described above is computed in the discrete cosine transform (DCT) domain for audio signals. Due to the presence of efficient Fast Fourier Transform methodologies known in the art, Nb is typically selected as a power of 2, e.g., Nb=1024. The size of the block is controlled by several factors. Since audio characteristics may change rapidly, the block size should be small to keep modifications localized in time. Smaller block sizes are also preferred during the decoding process during synchronization. However, the block size should be large enough to provide a high frequency resolution. The DCT frequency resolution is computed as $$fd = \frac{fs}{2Nb}$$

where fs is the sampling frequency of the audio signal. For Nb–1024 and fs=44100 Hz, the frequency resolution is Ed=21.53 Hz.

A length Nb block of audio samples produces Nb DCT coefficients. In the standard implementation, the DCT spectrum is generally segmented into smaller subbands. In particular, a subset of length N<Nb of the DCT coefficients is used to embed each data bit as described in (1). Each subband may consist of a different number of DCT coefficients. For example, the spectrum may be segmented into three bands in the frequency ranges of 1000–4000 Hz, 4000–8000 Hz, and 8000–15000 Hz.

The audio data embedding procedure also includes the MPEG psychoacoustic masking model 1 or 2, as known in the art, for checking tolerable error levels. The MPEG masking model is used to verify the perceptual quality of (1). Components of the embedded data signal may be scaled or clipped to meet the requirements of the masking model.

The Pseudo-Random Sequence

In one embodiment, one or two random keys x1 and x2 (i.e., seeds) are used from which a pseudo-random sequence p can be generated, by using a suitable pseudo-random sequence generator, such as described in R. Rivest, "Cryptography," pp. 717–755, in J. van Leeuwen (ed.), Handbook of Theoretical Computer Science, Vol. 1, Ch. 13, MIT Press, Cambridge, Mass., 1990, which is hereby incorporated by reference. Only the first key, x1, is used for most data embedding applications. The second key, x2, is required for watermarking audio. It is used to make counterfeiting very difficult. Popular generators include RSA, Rabin, Blum/Micali, and Blum/Blum/Shub, as known in the art, and as described in S. Goldwasser, M. Bellare, "Lecture notes on cryptography", preprint, July 1996: http://www-cse.ucsd.edu/users/mihir/papers/crypto-papers.html. With the proper keys, the embedded data may be extracted. Without the key(s), the data hidden in the signal is statistically undetectable and impossible to recover. Note that classical maximal length pseudo noise sequence (i.e., m-sequence) generated by linear feedback shift registers are not used to generate a pseudo-random sequence. Sequences generated by shift registers are cryptographically insecure: one can solve for the feedback pattern (i.e., the keys) given a small number of output bits p.

The noise-like sequence p can be used to derive the actual watermark hidden into the audio signal or control the operation of the watermarking algorithm, e.g., determine the location of samples that may be modified. The key x1 is author dependent. A second key, x2, is signal dependent. The key x1 is the key assigned to (or chosen by) the author. Key x2 is computed from the audio signal when the author wishes to watermark the audio signal. It is computed from the signal using a one-way hash function. For example, the tolerable error levels supplied by masking models are hashed to a key x2. Any one of a number of well-known secure one-way hash functions may be used to compute x2, including RSA, MD4, and SHA, as known in the art. MD4 is specifically described in R. Rivest, "The MD4 message digest algorithm", pp. 303–311 in Advances in Cryptology, CRYPTO 92, Springer, Tokyo, 1991, which is hereby incorporated by reference; SHA is specifically described in National Institute of Standards and Technology (NIST), Secure Hash Standard, NIST FIPS Pub. 180–1, Apr. 1995, which is also hereby incorporated by reference. For example, the Blum/Blum/Shub pseudo-random generator uses the one way function $y=g\_n(x)=x^2 \bmod n$ where $n=pq$ for primes p and q so that $p=q=3 \bmod 4$. In at least some embodiments, generating x or y from partial knowledge of y is computationally infeasible for the Blum/Blum/Shub generator.

A QR orthogonal-triangular decomposition operation is performed on the pseudo-random sequences before they are employed by the data embedding algorithm. A typical pseudo-random sequence generator creates a sequence of samples with values ranging from −1 to +1. The relative magnitudes of samples in the sequence may be on the order of $10^6$, leading to spiking and poor weighting characteristics. A QR decomposition is employed to maintain a relative magnitude in the samples on the order of 0.9 to 1.1.

The Weighting Function

A number of functions to weight the pseudo-random sequence p for robustness and perceptual quality can be been employed in accordance with different embodiments of the invention. The weighting coefficients w are generally computed as a function of the data coefficients x.

One method to generate the weighting values includes computing the average of the absolute value of the data coefficients about a length Nf interval $$w(i) = \frac{1}{Nf} \sum_{k=-(Nf-1)/2}^{(Nf-1)/2} |x(i-k)|$$

The value of Nf is kept small to keep the averaging localized, e.g., Nf=13. Out-of-band DCT coefficients were used at the boundaries of the averaging interval.

In other embodiments of the invention, the DCT subband is segmented into critical bands as described by the MPEG psychoacoustic model 1, known within the art. Each subband consists of Nc critical bands. The varying length critical bands increase in size with frequency. Several techniques to compute the weight wi for each critical band were employed. Note that each wi is a vector of the same length as each critical band.

In some embodiments, the weighting function is computed independently for each critical band. These include the one-norm, $$w(i) = w^1(i) = \sum_{k \in CB} |x(k)|$$

two-norm, $$w(i) = w^2(i) = \left( \sum_{k \in CB} |x(k)|^2 \right)^{1/2}$$

and infinity-norm $$w(i) = w\infty(i) = \max |x(k)|$$

Each of the weights is constant over its corresponding critical band.

The purpose of the weighting function is to approximate the relative tolerable error level for each DCT component and the corresponding accuracy at the receiver. For example, a weight for a tonal critical band may be large. However, the weight relative to the tonal is small. This is designed to emulate coding algorithms which generally introduce a smaller relative error in tonal components than in non-tonal components.

As the weight estimate is required at the receiver, the weighting function is required to be robust to many distortions. The aforementioned weighting functions are designed to perform well in terms of relative error before and after distortions to the host audio signal. In most cases the value of the weighting function wi depends on several data samples.

The Shaped Pseudo-Random Sequence

The second term in the data embedding methodology (1) includes two components: a and q. The a term was defined in (4). The shaped pseudo-random sequence, q, may be computed in a variety of manners from the secure pseudo-random sequence p.

In one embodiment, the shaped pseudo-random sequence is defined as $$q=p*w$$

where w consists of a weighting function defined in the previous section and * represents a component-by-component multiplication. As a result, the modification to the original data sequence is a scaled version of the pseudo-random sequence shaped by the weights.

A second approach employs a finer resolution in the modification by defining the shaped pseudo-random sequence as $$q=p*|x| \quad (5)$$

In this case, the pseudo-random sequence is shaped by the absolute value of the data it is modifying. The finer resolution in this case is due to the fact that the weights wi in the previous section are constant over multiple samples, i.e., the critical band. The modification in this case is performed at an individual sample level.

The previously described shaping techniques for the pseudo-random sequence only take into account frequency shaping, in at least some embodiments of the invention. To insure that the data embedding algorithm avoids pre- and post-echo distortions, a temporal shaping component is introduced. Recall that the embedding methodology is computed in the frequency domain. Let xt denote the data block in the time domain. Note that the length of the time data vector is Nb, i.e., the same length as the DCT block. To account for temporal shaping, the envelope of the data signal in the time domain is generated. First the DCT of the absolute value of the data in the time domain is computed $$X=dct(|xt|)$$

A second DCT signal x' is generated by retaining only the first K low frequency coefficients of X $$X' = \begin{cases} X(i) & \text{if } 0 \leq i \leq K \\ 0 & \text{otherwise} \end{cases}$$

Typically, 6<K<10 depending on the desired amount of smoothing of the envelope. An inverse DCT computation is performed on x' generating a smoothed envelope m of the data signal.

To generate q, an intermediate signal q' is computed as described in (5)

$$q'=p*|x|$$

The time-domain representation, qt', of the pseudo-random sequence q' is computed by $$qt'=idct(q')$$

and multiplied by the envelope m, generating a temporally-shaped pseudo-random sequence $$qt''=m*qt' \quad (6)$$

The DCT of the temporally-shaped pseudo-random sequence is computed, resulting in the final shaped pseudo-random sequence $$q=dct(qt'')$$

The value of a is then computed as described by (4). Note that the pseudo-random sequence p is shaped in both the frequency and time domains to increase the perceptual quality of the embedded data.

In one particular embodiment, a window h is introduced in (6). In particular, the window is introduced to generate a temporally-shaped and windowed pseudo-random sequence $$qt''=h*m*qt'$$

The other calculations are not affected. A rectangular window introduces an audible blocking effect in some audio signals. A shaped window h that tapers off near the beginning and ending of the block prevents the blocking noise. Gaussian and trapeziodal windows, as known in the art, are employed by the data embedding methodology.

A different approach to compute q based on coding error is now described. In this embodiment, the coded audio signal xc at the target bit rate and coding algorithm is generated and used to obtain the coding error $$e=x-xc$$

The shaped pseudo-random sequence q is computed as $$q=p*e$$

The approach exploits perceptual characteristics of most current audio coding algorithms. In particular, the coding error e generated by popular algorithms, e.g., Dolby's AC-3 and MPEG, as known in the art, is typically perceptually shaped.

In a related embodiment, the value of a described in (4) is modified to take into account coding error. Several different values of a are computed according to $$a = b \frac{dT}{\sum_{i=0}^{N-1} p(i) \frac{q(i)}{w(i)}}$$

where 0<<b<1 is employed to tweak to the value of a to the best value for the target bit rate. Each is tested by coding the embedded audio algorithm and recovering the embedded data bit. The best a is selected.

Tonal Detection

Tonal (harmonic) and non-tonal (residue) components in an audio signal have different perceptual characteristics based on the masking properties of the human auditory. system. For example, the amplitude of non-tonal and low level noise components in an audio signal may be modified in the range of 50–100% without a perceptually significant change to the audio. Perceptual changes in tonal components, however, may sometimes be detected after only a 10\% change in amplitude. The strength of embedded data may be limited by maximum allowable changes to the tonal components. To enhance the audio data hiding algorithm, a tool to detect the tonal components in audio signals was developed. By separating tonal and non-tonal components, the data embedding algorithm is able to maximize the strength of each component independently.

The tonal components in an audio signal are identified using a harmonic analysis technique as described in D. J. Thomson, "Spectrum estimation and harmonic analysis," Proceedings of the IEEE, vol. 70, no. 9, pp. 1055–1096, September, 1982, which is hereby incorporated by reference.

The analysis provides an accurate estimate of the location (frequency), amplitude, and phase of harmonic components in the audio. As described in the following section, this information may be used to change the weighting function. It may also used in an alternative data hiding.

The technique described in Thomson analyzes harmonic components in an audio signal by expanding the audio signal in terms of a set of orthogonal windows called prolate sequences. The expansion is followed by a statistical F-test to determine whether a tonal component exists at a particular frequency.

The harmonic analysis is performed on segments of Nb audio samples as described in the previous section. The audio segment is multiplied (windowed) by a set of K prolate sequences. A zero-padded discrete Fourier transform of each windowed data sequence is then computed. The windowing provides K different estimates of the spectrum based on the K different prolate windows. Zero-padding is used to prevent circular wrapping and provide a high level of frequency resolution. Typically the sequence is zero-padded to 2Nb or 4Nb. The harmonic mean at each frequency is then computed followed by an F-test statistic. The F-value at each frequency is a measure, of the ratio of the estimate of the magnitude of the harmonic at that frequency to that of the non-tonal part of the spectrum. If a tonal exists at a particular frequency, the F-value will be large. A small F-value indicates that the component is non-tonal. The frequencies corresponding to tonals in the audio are obtained by finding peaks in the F-statistics. The frequency, amplitude, and phase of each tonal component are then provided to the audio data embedding algorithm. The process is repeated on each length Nb segment of the audio.

Tonal Weighting

The tonal detection methodology provides the position (frequency) of each tonal component in a length Nb block of audio. With the tonal detection and audio data embedding algorithms synchronized in time and employing the same number of audio samples Nb, the data embedding algorithm uses the detected tonals occurring in each frequency band to modify the weighting function. Weights corresponding to tonal components (and frequency components near the tonal) are scaled differently than non-tonal components. Let z denote the set of tonal indexes returned by the tonal detection algorithm. A modified version x' of the data x is generated such that $$x'(k) = \begin{cases} Bx(k) & \text{if } k \in z \\ x(k) & \text{otherwise} \end{cases}$$

where 0<B<1 is a scaling value for tonal components. Parameter q is computed as described earlier using x' in place of x, i.e., $$q' = p^* |x'|$$

As a result, the tonal and non-tonal components of the data have a different effect on the computation of q through the use of the parameter B. This allows the algorithm to modify the amplitude of tonal components, e.g., by +/−10%, differently than non-tonal components, e.g., by +/−50%. The same tonal detection algorithm is employed by the receiver to generate the appropriate weights and recover the embedded information.

Tonal Shifting

An alternative embedding scheme employing tonal detection is now described. The embedding methodology first separates the original audio signal into a tonal component and a residual (non-tonal) component $$X = X_t + X_r$$

This embodiment uses the frequency, amplitude, and phase information provided by the tonal detection procedure to extract the tonal components.

The data embedding methodology modifies each component in a different manner. The residual component, xr, is modified using the standard embedding methodology described by (1). Information is embedded in the tonal components, xt, by shifting the relative position (frequency) of the tonals in an audio block. The tonal may be shifted since the human ear is unable to detect a difference in frequency within 3.6 Hz for frequencies below 500 Hz, and within 0.007f for frequencies f >500 Hz. For frequencies in Layer 1, 1000 Hz to 4000 Hz, the frequencies may change from 7 to 28 Hz, respectively. The modification is usually limited from 5 to 20 Hz to ensure perceptual quality. The modifications to the length Nb block are generally performed on a 2Nb or 4Nb zero-padded FFT to guarantee a high frequency resolution. The frequencies are shifted in accordance with a pseudo-random pattern.

Once the frequencies have been modified, the sinusoidal signal synthesis methodology described in R. J. McAulay, T. F. Quatieri, "Speech analysis/synthesis based on a sinusoidal representation," IEEE Trans. On Acoustics, Speech, and Signal Processing, vol. 34, no. 4, pp. 744–754, August., 1986, which is hereby incorporated by reference, is used to reconstruct the signal from the modified tonals. The McAulay methodology tracks frequencies from block to block to avoid discontinuities in the amplitudes and phases. The reconstruction algorithm locates a tonal in the next audio block closest to the tonal in the current block. If the closest tonal in the next block is within a pre-defined frequency range, the difference is assumed to represent the varying nature of audio. If the closest tonal in the next block is out of the frequency range, the tonal in the current block is assumed to have ceased. If a tonal appears in the next block that does not occur in the current block, a new tonal is flagged for tracking.

The amplitudes of tracked tonal components from block to block are matched using linear interpolation. A cubic interpolation function is used to match phases of tracked tonal components. The tonal component of the audio signal is then reconstructed by taking the inverse Fourier transform of the modified tonal amplitudes and phases.

The residual component, modified by the original audio data embedding algorithm, is added to the tonal component. The resulting signal has data embedded in both the tonal and non-tonal components.

The receiver recovers the embedded information by separating the tonal and residual components using the tonal detection algorithm. Data embedded in the residual component is recovered using the original data detection procedure. Information embedded in the tonal components is extracted by comparing the relative positions of the tonals with the pseudo-random patterns used by the data embedding algorithm. In particular, the information bit stream recovered depends on the match of the relative positions with the appropriate set of tonal patterns.

System

Figure 3:
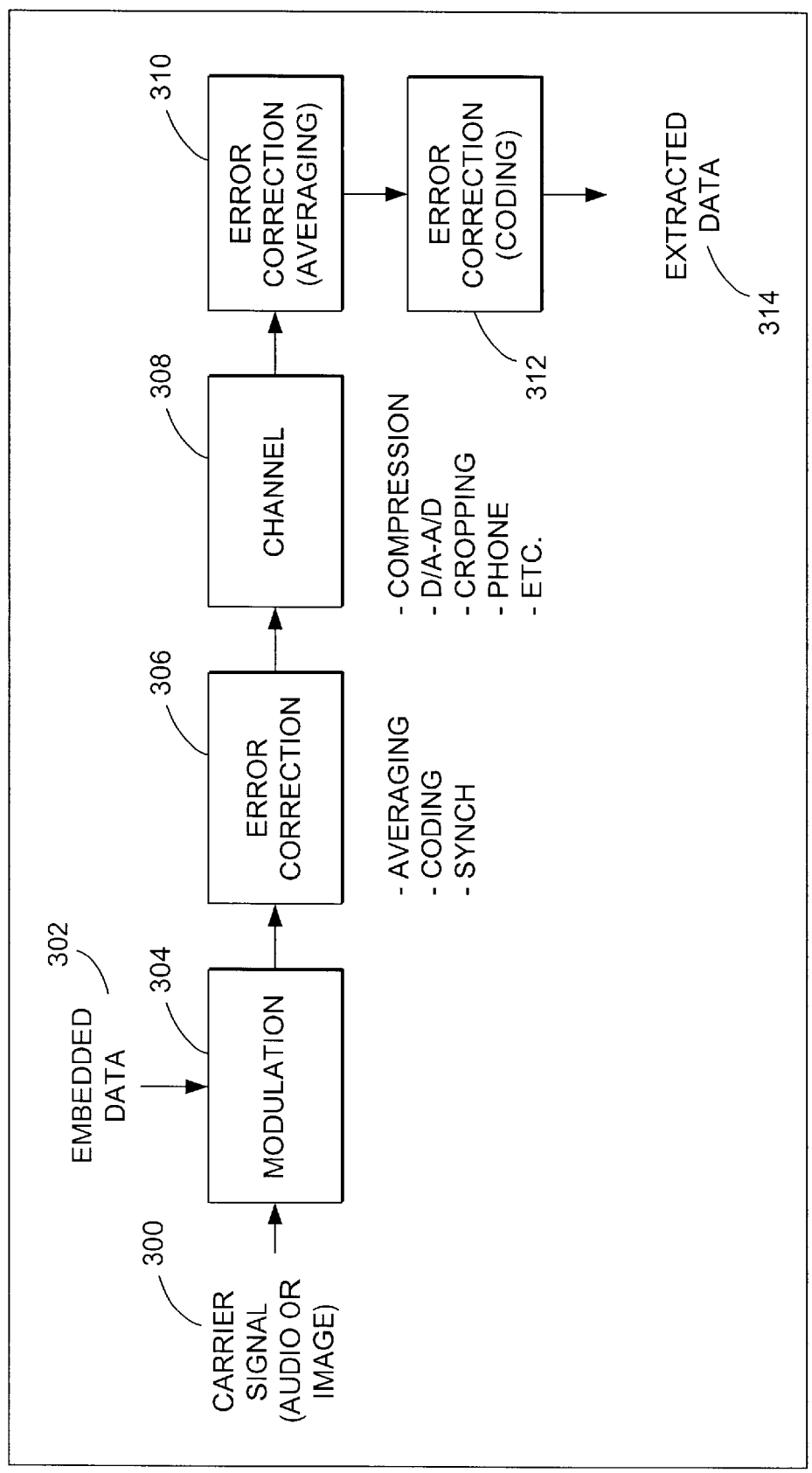
FIG. 3 shows a diagram of a system according to an embodiment of the invention; and, FIG. 4 shows a diagram of a computer in conjunction with which embodiments of the invention may be practiced.

Referring now to FIG. 3, a diagram of a system in accordance with an embodiment of the invention is shown. The system of FIG. 3 can in one embodiment be implemented in accordance with a computer, as will be described. The description of the system includes typical distortions and raw bit error rates at various points of the embedding, signal manipulation and data extraction chain.

The carrier signal 300 in the system is the audio or image host signal. The data embedding algorithm already described modulates the embedded data 302 (that is, the key or the watermark) with the carrier signal, as represented by block 304. The raw embed rate for mono CD quality audio at this stage in the system is 252 bits/sec (504 bits/sec stereo audio). The raw embed rate does not take into account any reduction in bit rate required for error correction or synchronization. For a 512×512 grayscale image, the raw data rate at this point is 8192 bits. The embedded bit rate may be up to 3 times higher for color images.

The next stage in the system consists of error correction and synchronization algorithms, as represented by block 306. Both are used for robustness under unknown channel conditions in one embodiment of the invention. Synchronization consists of repeatedly embedding a random pattern of bits known to the receiver. Much like the embedded data, the secure random pattern is based on encryption algorithms and may only be located by the appropriate audience. The synchronization bits reduce the raw bit rate by approximately 16%. Synchronization is essential to counteract the effects of the channel distortions that may delay, resize, rotate, crop, etc., the host signal. The receiver must be properly aligned with the embedded data for an accurate recovery of the information.

Two forms of error correction are employed by the data embedding system of FIG. 3. One error correction mechanism is an averaging function. The raw data consists of binary values, i.e., 0's and 1's. Each value is embedded in the host signal such that the receiver detects a value in the range of zero to 1. Under lossless conditions, the receiver will detect a value exactly equal to 0 or 1 for each embedded data bit. However, channel distortions (see below) will modify the audio and cause damage to the embedded bits. The value of each bit will no longer be strictly 0 or 1. For example, a value of 0 may increase to 0.2 or 0.4. A value of 0.5 provides no information, as each bit is equally likely. Error correction via averaging works by repeating a data bit in more than one location in the audio and averaging the corresponding values at the receiver to make a decision. Averaging helps reduce errors introduced by the channel distortions. The typical number of bits used in the averaging process ranges from 2 to 6 in one embodiment. However, this reduces the bit rate from ½ to ⅙ the original rate, respectively. Typical effective embed rates after bit repetition for audio are 7–21 bits/sec for each band-pass combination (see Progress Report #8). This amounts to 7 to 105 bits/sec depending on channel conditions that are desired to survive.

Error correction via averaging works in conjunction with the second error correction mechanism: error control coding. Error control codes use sophisticated functions to increase the reliability of digital data transmission. Error control coding works most efficiently in environments with relatively low bit error rates. Thus, error correction via averaging is an essential preprocessing step to keep the bit errors low prior to error control coding. A commonly used error control code is a block code, e.g., Hamming and BCH, as described in S. Lin, D. J. Costello, Error Control Coding: Fundamentals and Applications, Prentice-Hall Inc., Englewood Cliffs, N.J., 1991, which is hereby incorporated by reference. A block code breaks an information stream into message blocks of size k. The message block of length k is then represented by a length n codeword, where n>k. A total of n−k redundant bits are added to each message to detect and correct errors in the message introduced by the noisy channel.

Once the embedding process is done, the audio or image passes through the communication channel, as represented by block 308. The channel consists of any medium that may hold the audio or image data. The data may remain digital when transmitted through the channel, or may be converted to an analog form. For audio, this may include analog tapes, telephones, broadcast etc. For image media, the channel may include printer paper, newspapers, faxes, magazines, etc. Furthermore, any number of enhancements, coding representations, cropping, scaling, etc., may be applied to the host signal before reaching the receiver. A number of the degradation and distortions, e.g., telephone, printing, faxing, scanning, taping, can occur.

Figure 4:
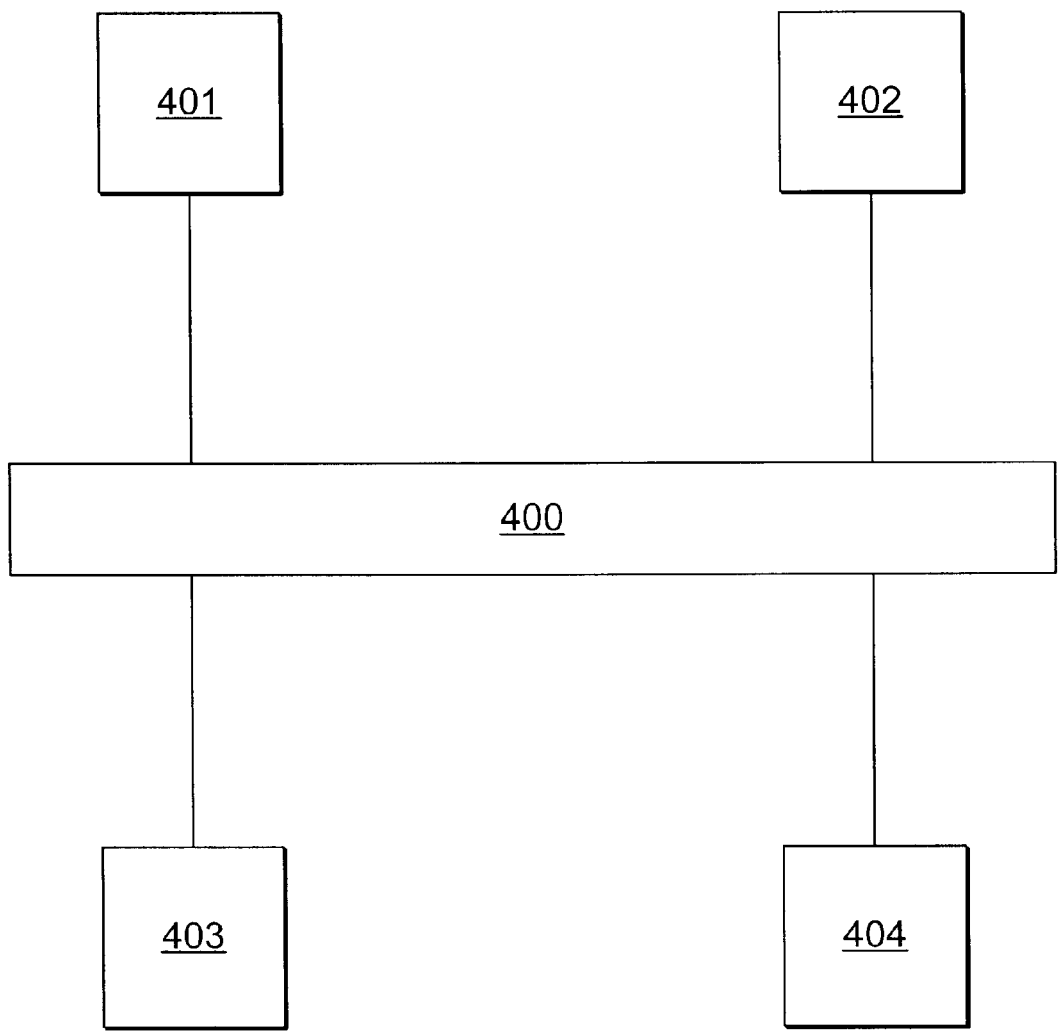

When the receiver obtains the host signal, the detection algorithm first synchronizes the received signal, as represented by block 310. Synchronization may require a search over a range of delays, scales, and rotations to properly align the received data. Once synchronized, the embedded data is extracted and processed by the error correction mechanisms. The values obtained for each repeated bit are combined and averaged to produce a bit estimate with reduced channel error. The BCH error control code is then applied to further reduce any bit errors, as represented by block 312. This significantly decreases the chance of suffering stray bit errors. The resulting extracted data 314 thus includes bits that are properly assembled into the proper ASCII text or binary representation to reform the embedded information. Computer Referring finally to FIG. 4, a diagram of a computer in conjunction with which embodiments of the invention may be practiced is shown. The computer comprises bus 400, keyboard interface 401, external memory 402, mass storage device 403 and processor 404. Bus 400 can be a single bus or a combination of multiple buses. Bus 400 can also comprise combinations of any buses. Bus 400 provides communication links between components in the computer. Keyboard controller 401 can be a dedicated device or can reside in another device such as a bus controller or other controller. Keyboard controller 401 allows coupling of a keyboard to the computer system and transmits signals from a keyboard to the computer system. External memory 402 can comprise a dynamic random access memory (DRAM) device, a static random access memory (SRAM) device, or other memory devices. External memory 402 stores information from mass storage device 403 and processor 404 for use by processor 404. Mass storage device 403 can be a hard disk drive, a floppy disk drive, a CD-ROM device, or a flash memory device. Mass storage device 404 provides information to external memory 402. Processor 404 can be a microprocessor and is capable of decoding and executing a computer program such as an application program or operating system with instructions from multiple instruction sets.

Multimedia data embedding has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:

receiving a vector x of N data samples, where x=[x(0)x(1) . . . x(N−1)] and represents multimedia;

receiving a vector p, where p=[p(0)p(1) . . . p(N−b 1)] and represents a pseudo-random sequence; and, generating a new vector x' in which the vector p is embedded in the vector x, such that x'=[x'(0)x'(1) . . . x'(N−1)] and x'=x +aq where a comprises a perception-based scaling factor and the vector q comprises a perceptually weighted pseudo-random sequence based on the vector p;

wherein q=p*w, where w represents a weighting function, and wherein $$w(i) = \frac{1}{Nf} \sum_{k=-(Nf-1)/2}^{(Nf-1)/2} |x(i-k)|,$$

and f, represents a frequency and N represents a length.

2. The computer-implemented method of claim 1, wherein the vector x represents multimedia selected from the group essentially consisting of: audio, image, and video.

3. The computer-implemented method of claim 1, wherein the vector p represents a cryptographically secure pseudo-random sequence.

4. The computer-implemented method of claim 1, wherein generating the new vector x' in which the vector p is embedded in the vector x comprises generating the new vector x' in a discrete cosine transform (DCT) domain.

5. The computer-implemented method of claim 1, wherein receiving the vector p comprises generating the vector p using a pseudo-random sequence generator selected from the group essentially consisting of: RSA, Rabin, Blum/Micali, and Blum/Blum/Shub.

6. A computer-implemented method comprising:

receiving a vector x' of N data samples in which a vector p is embedded in a vector x, such that x=[x(0)x(1) . . . x(N−1)] and represents multimedia, p=[p(0)p(1) . . . p(N−1)] and represents a pseudo-random sequence, x'=[x'(0)x'(1) . . . x'(N−1)] and x'=x+aq, where a comprises a perception-based scaling factor and the vector q comprises a perceptually weighted pseudo-random sequence based on the vector p;

decoding the vector p from the vector x', including determining $$\frac{1}{T}\sum_{i=0}^{N-1} p(i)\frac{x'(i)}{w(i)} =$$

$$\frac{1}{T}\sum_{i=0}^{N-1} p(i)\frac{x(i)+aq(i)}{w(i)} = \frac{1}{T}\sum_{i=0}^{N-1} p(i)\frac{x(i)}{w(i)} + \frac{a}{T}\sum_{i=0}^{N-1} p(i)\frac{q(i)}{w(i)},$$

where w comprises a vector of weights, and T determines a quantization step.

7. The computer-implemented method of claim 6, wherein the vector x represents multimedia selected from the group essentially consisting of: audio, image, and video.

8. The computer-implemented method of claim 6, where $$w(i) = \frac{1}{Nf} \sum_{k=-(Nf-1)/2}^{(Nf-1)/2} |x(i-k)|,$$

and where f represents a frequency and N represents a length.

9. The computer-implemented method of claim 6, wherein T depends on a weighting mechanism.

10. A system to embed a key into multimedia data to generate keyed multimedia data comprising:

means for receiving a vector x of N data samples, where x=[x(0)x(1) . . . x(N−1)] and represents multimedia;

means for receiving a vector p, where p=[p(0)p(1) . . . p(N−1)] and represents a pseudo-random sequence; and, means for generating a new vector x' in which the vector p is embedded in the vector x, such that x'=[x'(0)x'(1) . . . x'(N−1)] and x'=x+aq, where a comprises a perception-based scaling factor and the vector q comprises a perceptually weighted pseudo-random sequence based on the vector p;

wherein q=p*w, where w represents a weighting function, and wherein $$w(i) = \frac{1}{Nf} \sum_{k=-(Nf-1)/2}^{(Nf-1)/2} |x(i-k)|,$$

and f represents a frequency and N represents a length.

11. A system to decode a key from keyed multimedia data in which the key has been embedded into multimedia data comprising:

means for receiving a vector x' of N data samples in which a vector p is embedded in a vector x, such that x=[x(0)x(1) . . . x(N1)] and represents multimedia, p=[p(0)p(1) . . . p(N−1)] and represents a pseudo-random sequence, x'=[x'(0)x'(1) . . . x'(N−1)] and x'=x+aq, where a comprises a perception-based scaling factor and the vector q comprises a perceptually weighted pseudo-random sequence based on the vector p;

means for decoding the vector p from the vector x', including determining $$\frac{1}{T}\sum_{i=0}^{N-1} p(i)\frac{x'(i)}{w(i)} =$$

$$\frac{1}{T}\sum_{i=0}^{N-1} p(i)\frac{x(i)+aq(i)}{w(i)} = \frac{1}{T}\sum_{i=0}^{N-1} p(i)\frac{x(i)}{w(i)} + \frac{a}{T}\sum_{i=0}^{N-1} p(i)\frac{q(i)}{w(i)};$$

where w comprises a vector of weights, and T determines a quantization step.

12. A computer-readable medium having processor instructions stored thereon for execution by a processor to perform a method comprising:

receiving a vector x of N data samples, where x= [x(0)x(1) . . . x(N−1)] and represents multimedia;

receiving a vector p, where p=[p(0)p(1) . . . p(N−1)] and represents a pseudo-random sequence; and generating a new vector x' in which the vector p is embedded in the vector x, such that x'=[x'(0)x'(1) . . . x'(N−1)] and x'=x +aq, where a comprises a perception-based scaling factor and the vector q comprises a perceptually weighted pseudo-random sequence based on the vector p;

wherein q=p*w, where w represents a weighting function, and wherein $$w(i) = \frac{1}{Nf} \sum_{k=-(Nf-1)/2}^{(Nf-1)/2} |x(i-k)|,$$

and f represents a frequency and N a length.

13. A computer-readable medium having processor instructions stored thereon for execution by a processor to perform a method comprising:

receiving a vector x' of N data samples in which a vector p is embedded in a vector x, such that x=[x(0)x(1) . . . x(N−1)] and represents multimedia, p=[p(0)p(1) . . . p(N−1)] and represents a pseudo-random sequence, x'=[x'(0)x'(1) . . . x'(N−1)] and x'=x+aq, where a comprises a perception-based scaling factor and the vector q comprises a perceptually weighted pseudo-random sequence based on the vector p;

decoding the vector p from the vector x', including determining $$\frac{1}{T}\sum_{i=0}^{N-1} p(i)\frac{x'(i)}{w(i)} =$$

$$\frac{1}{T}\sum_{i=0}^{N-1} p(i)\frac{x(i)+aq(i)}{w(i)} = \frac{1}{T}\sum_{i=0}^{N-1} p(i)\frac{x(i)}{w(i)} + \frac{a}{T}\sum_{i=0}^{N-1} p(i)\frac{q(i)}{w(i)},$$

where w comprises a vector of weights, and T determines a quantization step.

* * * * *